United States Patent
Kusakabe et al.

(10) Patent No.: US 7,197,767 B2
(45) Date of Patent: Mar. 27, 2007

(54) INFORMATION DISTRIBUTION SYSTEM AND INFORMATION MANAGEMENT METHOD

(75) Inventors: Susumu Kusakabe, Kanagawa (JP); Motoki Nakade, Tokyo (JP); Isao Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 847 days.

(21) Appl. No.: 09/729,569

(22) Filed: Dec. 4, 2000

(65) Prior Publication Data
US 2001/0032250 A1    Oct. 18, 2001

(30) Foreign Application Priority Data
Dec. 8, 1999 (JP) ............... P11-348733

(51) Int. Cl.
*G07F 7/00* (2006.01)
(52) U.S. Cl. .......................... 726/20; 726/9
(58) Field of Classification Search ............ 380/23, 380/24, 228; 235/384, 380, 492; 713/201, 713/193; 705/13; 726/9, 20
See application file for complete search history.

(56) References Cited

U.S. PATENT DOCUMENTS

| | | | |
|---|---|---|---|
| 5,754,654 A * | 5/1998 | Hiroya et al. ............ | 705/76 |
| 5,936,221 A | 8/1999 | Corder et al. | |
| 5,953,705 A | 9/1999 | Oneda | |
| 6,085,976 A * | 7/2000 | Sehr ........................ | 235/384 |
| 6,088,680 A * | 7/2000 | Hoshino et al. ........... | 705/13 |
| 6,398,115 B2 * | 6/2002 | Krause ..................... | 235/492 |

FOREIGN PATENT DOCUMENTS

| | | |
|---|---|---|
| EP | 0 708 417 | 4/1996 |
| EP | 0 823 694 | 2/1998 |
| EP | 0 829 828 | 3/1998 |
| EP | 0 950 968 | 10/1999 |
| EP | 1 103 922 | 5/2001 |
| NL | 9 301 902 | 6/1995 |
| WO | WO 97/45814 | 12/1997 |
| WO | WO 98/47116 | 10/1998 |

* cited by examiner

*Primary Examiner*—Gilberto Barrón
*Assistant Examiner*—Ellen C Tran
(74) *Attorney, Agent, or Firm*—Bell, Boyd & Lloyd LLP

(57) ABSTRACT

An information distribution system includes a portable electronic device, and an information management apparatus for storing both right information and information which corresponds to the portable electronic device and which indicates to whom a right belongs. By using a code unique to the portable electronic device to encrypt concert information as the right information to be offline-providable form, and providing a ticket code generated by the encryption so that it passes through an offline channel at least once, the distribution to each user of the encrypted information can be simplified.

26 Claims, 12 Drawing Sheets

INFORMATION DISTRIBUTION SYSTEM AND INFORMATION MANAGEMENT METHOD

BACKGROUND OF THE INVENTION

1. Field of the Invention

The present invention relates to information distribution systems and information management methods, and can be applied to, for example, a system that issues and manages concert tickets.

2. Description of the Related Art

Concert tickets, etc., are issued in stores in response to requests accepted, or accessing an issuance server in accordance with accepted telephone reservations, whereby the sale of a plurality of tickets for one seat number is prevented.

Accordingly, when a user directly buys a ticket from a store, the store checks whether a seat is available, and the user buys an issued ticket. When a user uses telephone reservation to buy a ticket, after making a reservation, the user can receive the ticket by mail, or the user can buy the ticket from a store, based on the verification of a reservation number.

For issuing tickets at stores, as described above, issuing equipment must be provided for each store. Also, for sending reserved tickets by mail, various types of equipment and various operations are necessary. Accordingly, such a ticket selling method has a problem in that the distribution of tickets to users is troublesome.

In addition, after each user obtains a ticket, the management thereof is a complicated. By way of example, when a user distributes tickets among friends, the user needs to meet the friends to hand out the tickets. If the user is unable to meet the friends, the user must distribute the tickets to them by mail or the like. This case will require time and money for delivering the tickets to the friends, and accidents such as loss of the tickets cannot be completely prevented. Also when a user transfers an obtained ticket to a third party, the transfer similarly requires time and money, and accidents such as loss of the tickets may occur. If a user loses a concert ticket, the user is prevented from going to the concert.

As one solution to the above problems, a method is considered in which tickets are sold such that each user records various types of information in an integrated circuit (IC) card by accessing it from a personal computer. In other words, in this method, instead of each ticket produced by printing concert-related information on paper, the IC card in which the information is recorded is used. This method can simplify ticket distribution to the user because online processing is possible.

However, this method requires a personal computer and an IC card reader/writer connected to the personal computer. Also, if a user does not have such equipment, that user must go to a store having the equipment. Moreover, after a ticket is delivered to each user, it cannot be transferred to a third party.

SUMMARY OF THE INVENTION

Accordingly, it is an object of the present invention to provide an information distribution system and an information management method that simplify both the distribution to users of information indicating to whom a right having monetary value belongs to, and the management of the information after the distribution.

To this end, according to an aspect of the present invention, the foregoing object is achieved through provision of a right-information distribution method including the steps of: generating right information and verification information for authenticating the validity of a portable electronic device when the right information is stored in the portable electronic device; generating a right code, which is provided offline, by encrypting the right information and the verification information; inputting the offline-provided right code to the portable electronic device; decrypting the input right code and using the verification information to authenticate the right information based on the decrypted right code; and storing the authenticated right information in the portable electronic device.

According to another aspect of the present invention, the foregoing object is achieved through provision of a right-information distribution method for transferring right information from a first portable electronic device to a second portable electronic device. The right-information distribution method includes the steps of: generating the right information and verification information for authenticating the validity of the first portable electronic device when the right information is stored in the first portable electronic device; generating a first right code, which is provided offline, by encrypting the right information and the verification information; inputting the offline-provided first right code and the identification number of the second portable electronic device to the first portable electronic device; after confirming the input first right code and the input identification number, invalidating the first right code and generating a second right code, which is provided offline; inputting the second right code to the second portable electronic device; decoding the input second right code and authenticating the decoded second right code; and storing, in the second portable electronic device, the right information which is included in the authenticated second right code.

According to a further aspect of the present invention, the foregoing object is achieved through provision of an information distribution system including a portable electronic device for a user, and an information management apparatus for storing both information on a predetermined right and information corresponding to the portable electronic device, the second information indicating to whom a right belongs. The information distribution system manages the location of the right by updating the right information stored by the information management apparatus and the information indicating to whom the right belongs. The information management apparatus includes an information holding means for holding the right information, an access means for recording the transfer of the right to the user by accessing the information holding means and for updating the right information held by the information holding means, an encryption means for generating encrypted information by using a code unique to the portable electronic device to encrypt the information indicating to whom the right belongs to be in an offline providable form, and an information providing means for providing the user with the encrypted information so that the encrypted information passes through an offline channel at least once. The portable electronic device includes an input means for accepting the input of the encrypted information, a decryption means for decrypting the encrypted information using the unique code and outputting the information indicating to whom the right belongs, a recording means for recording the output information indicating to whom the right belongs, and an information output means for using a predetermined access means to output the recorded information indicating to whom the right belongs.

According to another aspect of the present invention, the foregoing object is achieved through provision of an information management method for, by updating right information held by an information management apparatus and by recording in a portable electronic device information indicating to whom the right belongs, managing the right so as to be exercised when the portable electronic device is with a user. The information management method controls the information management apparatus to perform the steps of: generating encrypted information to be in an offline providable form by using a code unique to the portable electronic device to encrypt the information indicating to whom the right belongs; and providing the user with the encrypted information so that the encrypted information passes through an offline channel at least once.

DESCRIPTION OF THE PREFERRED EMBODIMENTS

With reference to the accompanying drawings, embodiments of the present invention are described below.

1. First Embodiment 1-1. Construction of First Embodiment

Figure 1:
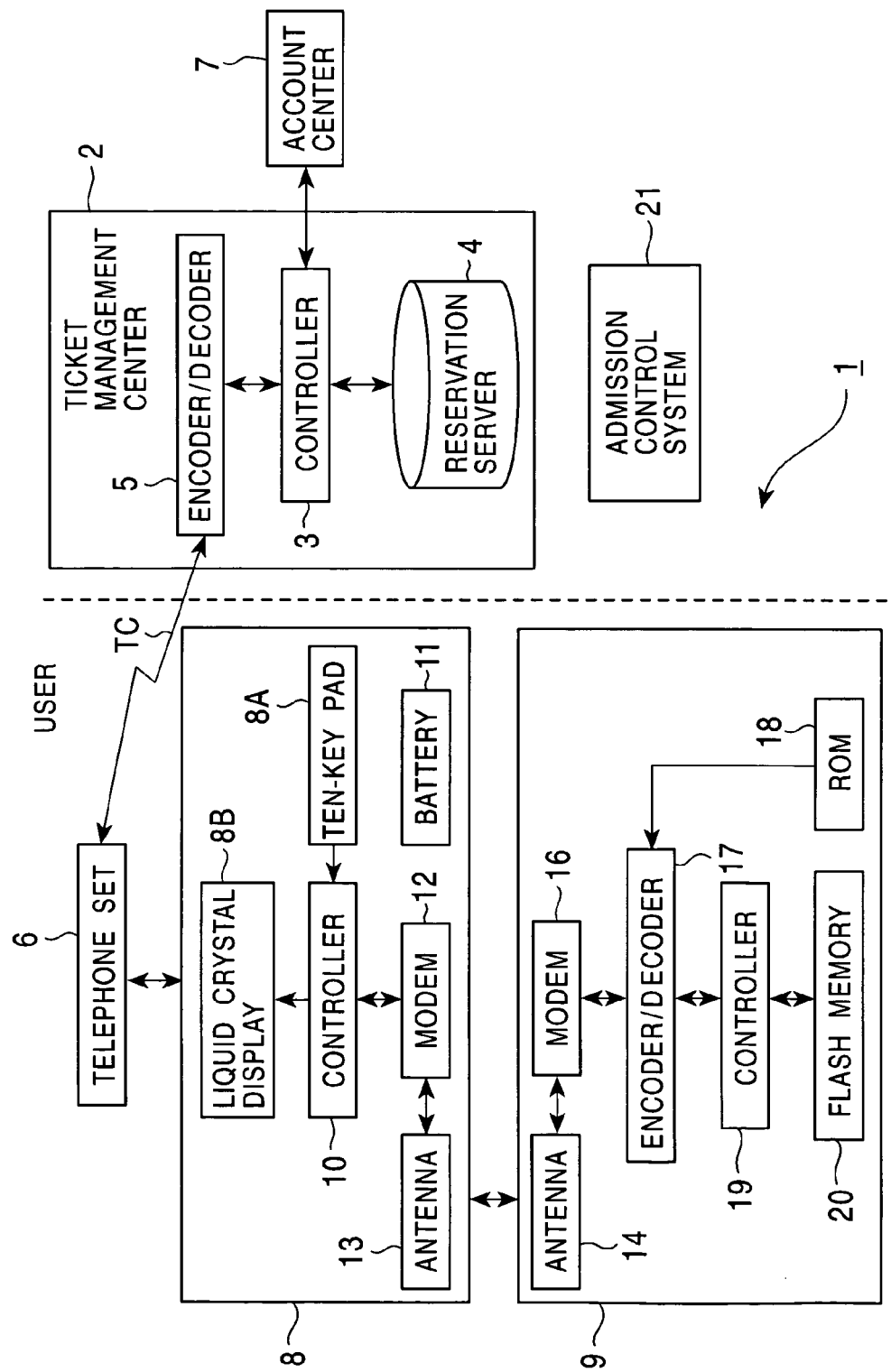
FIG. 1 is a block diagram showing ticket distribution system 1 according to an embodiment of the present invention.

FIG. 1 shows a ticket distribution system 1 according to a first embodiment of the present invention. The ticket distribution system 1 is an information distribution system that manages information on a right of admission to a place for entertainment such as a concert. For the ticket distribution system 1, a ticket management center 2 sells tickets to users, and accepts cancellations of the tickets.

Specifically, in the ticket management center 2, a controller 3 accesses a reservation server 4 to sell the tickets by executing processing (described later) in accordance with user accessing via a telephone line. The controller 3 also accepts cancellations of the sold tickets in accordance with requests from the users.

When connected to the telephone line, the controller 3 provides voice-used guidance each user. The controller 3 accepts user accessing based on the operation of a ten-key pad of a telephone set 6 in response to the guidance. In addition, the controller 3 accepts both user access based on an operator's operation performed during a conversation between the operator and the user, and user access based on the operator's operation performed by reading ordinary mail or electronic mail.

By accessing an account center 7, as required, the controller 3 instructs the account center 7 to perform accounting related to the sale of the tickets and refunds for ticket cancellation. The account center 7 performs billing for each user to whom a ticket was sold, and executes refunding for each user who cancelled a ticket without billing.

A reservation server 4 records information, such as the date, the place, and the seat number, on a concert or the like which is managed by the ticket management center 2. Under the control of the controller 3, the reservation server 4 notifies the controller 3 of the recorded information, and also records information on whether each seat number is sold and each member number to which a sale is performed. The member number is a unique number which is set in an IC card distributed to each member registered in the ticket management center 2. The member number includes a predetermined check code based on which predetermined arithmetic processing is implemented for user authentication.

Under the control of the controller 3, an encoder/decoder 5 compresses information such as the concert date, the seat number, etc. (hereinafter referred to as "concert information") on a ticket purchased by the user, and generates a ticket code TC by encrypting the compressed information. The encoder/decoder 5 notifies each user of the ticket code TC.

When using a member number to encrypt the concert information, the encoder/decoder 5 encrypts the concert information with key information which is unique to each member, whereby the encoder/decoder 5 establishes security to prevent a third party from unlawfully obtaining a ticket. The ticket code TC is generated based on a serial number corresponding to operation elements of a reader/writer 8 (described later). Accordingly, the encoder/decoder 5 can provide the user with the ticket code TC through an offline channel such as speech. Since the encoder/decoder 5 can notify the user of the ticket code TC, the user can easily perform manual input of the notified ticket code TC by operating the reader/writer 8. Use of the offline channel means the exclusion of a case in which the link between the ticket management center 2 and the IC card 9 is directly or indirectly established for directly recording the ticket code TC transmitted from the ticket management center 2 in the IC card 9. In other words, use of the offline channel means, for example, exclusion of a case in which the ticket code TC is input to the IC card 9 by user operations, using information transmitted so as to be understood through user's five senses, as in this embodiment.

It may be said that concert information is information printed on a paper ticket, which indicates to whom a right belongs, because the concert information indicates that a right to enjoy the concert at a seat corresponding to a seat number represented by the concert information belongs to a user who retains the ticket having the concert information.

The ticket code TC is information that can be provided by an offline channel, and is at least recordable encrypted information generated such that, by using a ten-key pad of the reader/writer 8, which is part of a portable electronic device retained by the user, a unique code is used to encrypt the concert information.

In this process, the encoder/decoder 5 generates the ticket code TC by adding a predetermined check code to the concert information. This predetermined check code is generated by a predetermined algorithm using the member number and the concert information, and is a verification code indicating the validity of the ticket code TC. Accordingly, the encoder/decoder 5 can prevent a third party from being admitted to the concert with an unlawfully generated ticket code TC.

In an online system formed by connecting a reader/writer to a personal computer, the personal computer is essential and it is necessary to pay for an interface. However, when the ticket code TC is manually input, the need for the personal computer is eliminated and the interface is also not necessary. Thus, on a user side having the reader/writer 8, a ticket can be obtained by a simplified construction. In the encoder/decoder 5, the generated ticket code TC is used to drive a speech synthesizing circuit (not shown), whereby the user is notified of the ticket code TC by speech.

The encoder/decoder 5 decodes the ticket code TC from the user, and notifies the controller 3 of the decoded ticket code TC. At this time, the encoder/decoder 5 uses a check code to determine whether the ticket code TC is valid. This prevents a third party from reselling an unlawfully obtained right.

When one user buys a plurality of tickets, the ticket management center 2 issues as many ticket codes TCs as there are tickets. For applications by mail, the ticket management center 2 issues, by mail, ticket codes TCs printed by a predetermined printing unit (not shown). For applications by electronic mail, the ticket management center 2 notifies users of ticket codes TCs by electronic mail.

The user uses the telephone set 6 to access the ticket management center 2, and notifies the ticket management center 2 of the desired processing. By responding to a series of questions in the form of speech from the ticket management center 2 in accordance with the notification, the user applies for a ticket and receives a ticket code TC in the form of speech. The user records the concert information in the IC card 9 by using the reader/writer 8 to input the ticket code TC in the IC card 9. Accordingly, the IC card 9 is carried to the concert place by the user, the content of the IC card 9 is checked when the user enters the place, and the user can enjoy the concert.

Similarly, by accessing the ticket management center 2, the ticket can be cancelled.

Figure 2:
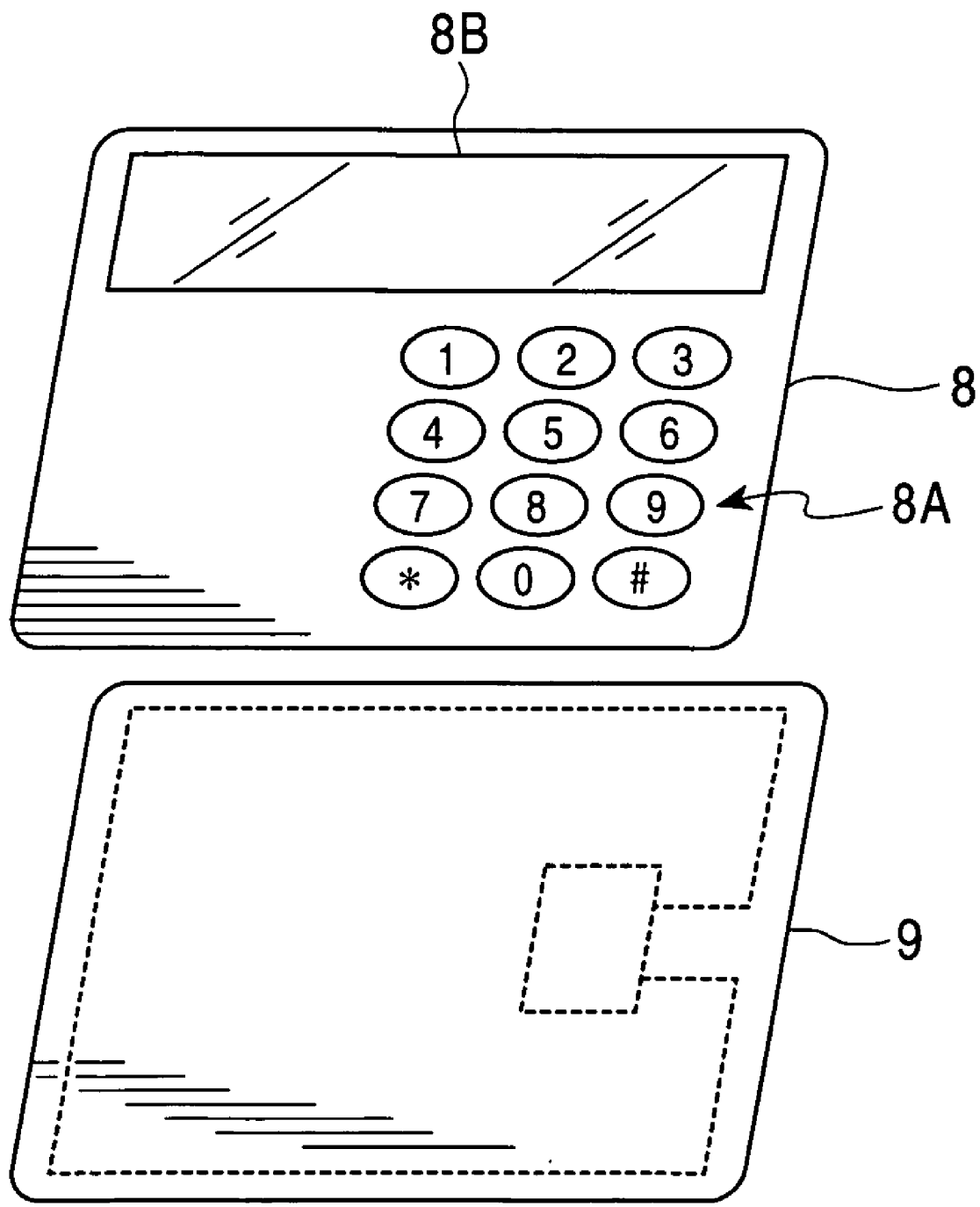
FIG. 2 is a perspective view showing a reader/writer 8 and an IC card 9 for use in the ticket distribution system 1 shown in FIG. 1.

FIG. 2 is a perspective view of the reader/writer 8 and the IC card 9. Each of the reader/writer 8 and the IC card 9 is formed in the form of a sheet having a size defined in the Japanese Industrial Standard. Each of the reader/writer 8 and the IC card 9 is produced by mounting an integrated circuit chip on a sheet wiring substrate, and covering the top and bottom surfaces of the chip with protection sheets. The IC card 9 is a noncontact memory card, and is supplied with power from the reader/writer 8. The reader/writer 8 records information in the IC card 9, and confirms the information recorded in the IC card 9.

When the reader/writer 8 is overlaid on the IC card 9, a built-in antenna of the reader/writer 8 is electromagnetically coupled to the built-in antenna, whereby driving power is supplied to the IC card 9. In this disposition, by operating the ten-key pad 8A of the reader/writer 8, operations with the ten-key pad 8A are transmitted to the IC card 9, and the operation mode of the IC card 9 is set. The subsequent operation of the ten-key pad 8A of the reader/writer 8 records information in the IC card 9, and control by the IC card 9 displays information output from the IC card 9 on the liquid crystal display 8B of the reader/writer 8. By performing these successive processing steps, the reader/writer 8 records the concert information based on the ticket code TC that the user receives by speech, and updates the information stored in the IC card 9 in accordance with ticket cancellation from the user. Also, tickets, purchased by the user at the same time, can be distributed to user's friends, etc.

In the reader/writer 8 (shown in FIG. 1), a battery 11 is a power supply for the reader/writer 8 and the IC card 9. Under the control of a controller 10, a modem 12 supplies operating power to the IC card 9 by using a predetermined high-frequency signal to activate an antenna 13. At this time, the modem 12 is controlled by the controller 10 to modulate the amplitude of the high-frequency signal. This transmits the operation of the ten-key pad 8A to the IC card 9. By detecting a change in the amplitude of the high-frequency signal, which is caused by the electromagnetic coupling between the antenna 14 of the IC card 9 and the antenna 13, information transmitted from the IC card 9 is received and transmitted to the controller 10.

Figure 3:
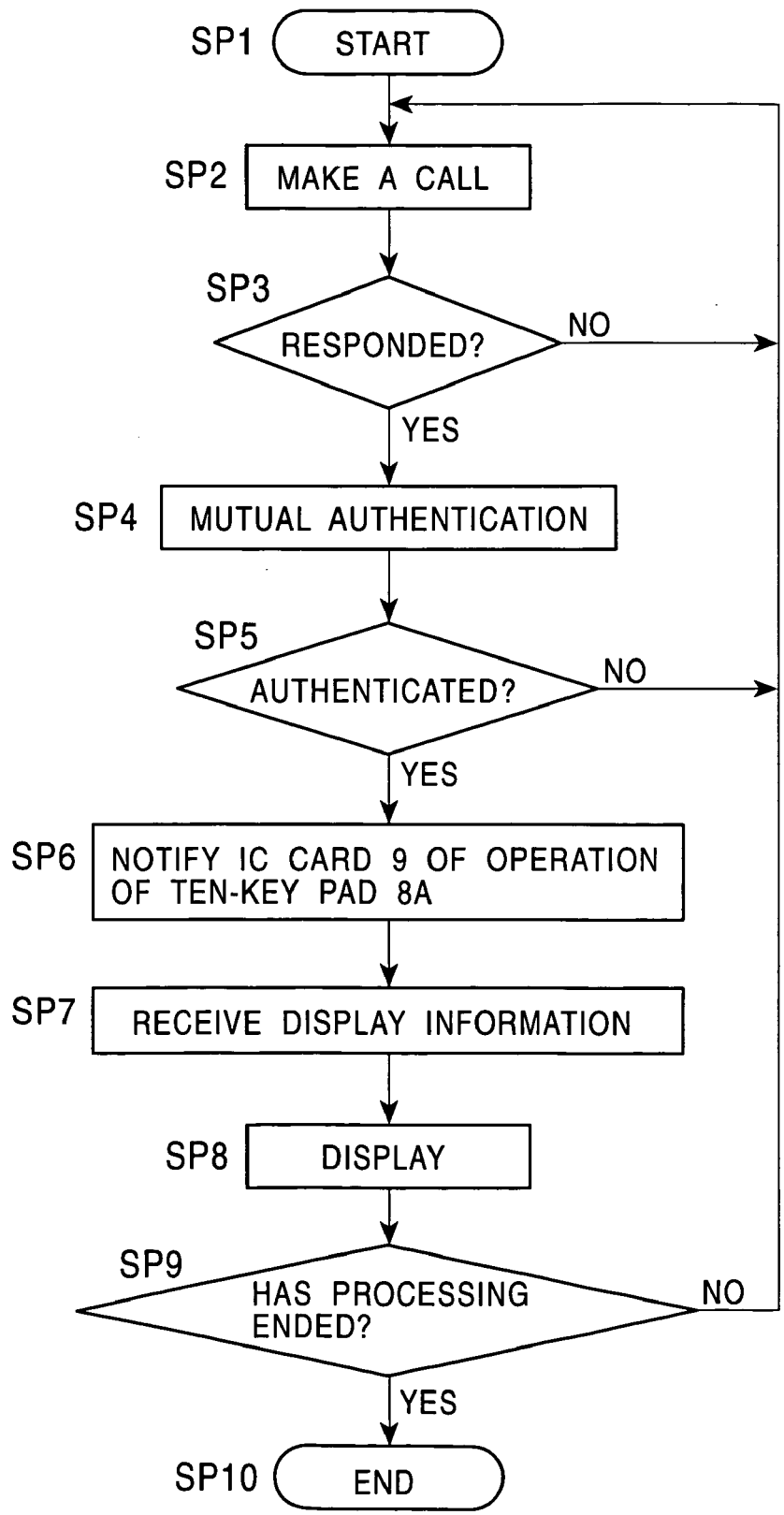
FIG. 3 is a flowchart showing a control process performed by the reader/writer 8 shown in FIG. 2.

The controller 10 of the reader/writer 8 is a control circuit that controls the operation of the reader/writer 8. By executing the process shown in FIG. 3, the controller 10 transmits the operation of the ten-key pad 8A to the IC card 9, and displays the concert information, the ticket code TC, etc., which are recorded in the IC card 9.

In the controller 10, power supply to each circuit block by the battery 11 is initiated in accordance with the operation of the ten-key pad 8A, whereby the controller 10 starts to operate. After starting to operate in step SP1, the controller 10 executes step SP2, and controls the modem 12 to activate the antenna 13 in order to initiate power supply to the IC card 9. The controller 10 also makes a call for the IC card 9 to establish a link to the reader/writer 8.

In step SP3, the controller 10 determines whether the IC card 9 has responded to the call from the reader/writer 8 by confirming transmission from the modem 12. If the controller 10 has determined that the IC card 9 has not responded, the controller 10 proceeds back to step SP2. The controller 10 makes a call for the IC card 9 to establish a link by repeatedly executing steps SP2, SP3, and SP2. If the IC card 9 has responded, the controller 10 proceeds to step SP4.

In step SP4, the controller 10 executes mutual authentication by exchanging a predetermined code with the IC card 9. In step SP5, the controller 10 determines whether the mutual authentication has been correctly executed. If the controller 10 has determined negatively, the controller 10 determines that the responder differs from the IC card 9. Accordingly, the controller 10 proceeds back to step SP2, and makes a call for the IC card 9 to establish a link gain.

If the controller 10 has determined affirmatively, the controller 10 proceeds to step SP6, and transmits the operation of the ten-key pad 8A to the IC card 9. This transmission enables the reader/writer 8 to switch the operation of the IC card 9 and to execute processing such as the input of the ticket code TC. This transmission is executed such that the controller 10 notifies the IC card 9 of a code corresponding to each operation of the ten-key pad 8A by driving the modem 12 and confirms whether the IC card 9 responds. The controller 10 displays the result of the operation of the ten-key pad 8A.

After the IC card 9 is notified of the operation of the ten-key pad 8A, when the IC card 9 determines that the input using the ten-key pad 8A ends, the controller 10 proceeds to step SP7 in accordance with a notification from the IC card 9, and receives display information from the IC card 9. The controller 10 proceeds to step SP8, and displays the display information on the liquid crystal display 8B instead of the display by the ten-key pad 8A. This enables the controller 10 to confirm, when the user buys a ticket and a ticket code TC, that the operation mode of the IC card 9 has been switched to a mode for inputting the ticket code TC. By switching the operation modes, information recorded in the IC card 9, such as the ticket code TC, the date of the corresponding concert, and a seat number, can be confirmed. In addition, for example, in the case where tickets are distributed to friends of the user, when some of the tickets are cancelled, corresponding ticket codes TCs of which the friends and the ticket management center 2 are notified, and the member number recorded in the IC card 9 can be confirmed.

The controller 10 proceeds to step SP9, and determines whether steps SP1 to SP8 have ended. If the controller 10 has determined negatively in step SP9, it proceeds back to step SP2. This enables the controller 10 to actually execute the input of the ticket code TC subsequently to the setting of the operation mode and to sequentially input a plurality of ticket codes TCs.

In step SP9, if the controller 10 has determined affirmatively, it proceeds to step SP10, and terminates this process.

In the IC card 9 (shown in FIG. 1), a modem 16 receives the information transmitted from the reader/writer 8 by detecting a change in the amplitude of a high-frequency signal induced in the antenna 14, and notifies an encoder/decoder 17 of the received information. The modem 16 transmits various types of information by changing the amplitude of the high-frequency signal induced in the antenna 14 in accordance with the input information via the encoder/decoder 17.

A read-only memory (ROM) 18 holds a member number as a number unique to each user. Under the control of a controller 19, the encoder/decoder 17 demodulates the information received by the modem 16, using the member number held in the ROM 18. In this construction, when the ticket code TC is input from the reader-writer 8, the encoder/decoder 17 demodulates the ticket code TC to obtain concert information, and notifies the controller 19 of the concert information. Conversely, the encoder/decoder 17 is controlled by the controller 19 to encrypt the concert information to generate a ticket code TC, and outputs the ticket code TC to the modem 16. Accordingly, in the case where tickets purchased at the same are distributed to friends of the user, when some of the tickets are cancelled, a ticket code TC is generated and is output to the reader/writer 8.

Under the control of the controller 19, in a flash memory 20, the concert information and the ticket code TC, obtained as described above, are recorded and a history of the update of the concert information is also recorded.

The controller 19 is a control circuit that controls the operation of the IC card 9. By executing a process (described later), the controller 19 records, in the flash memory 20, the concert information based on the ticket code TC issued by the ticket management center 2, and executes a series of processes for the distribution and transfer of tickets.

In FIG. 1, an admission control system 21 includes a ticket checker having a structure identical or similar to that of an automatic ticket checker at a station, and a personal computer that controls admission of each user via the ticket checker. The admission control system 21 is disposed at the entrance of each concert place. In the admission control system 21, a reader/writer that has a structure identical or similar to that of the reader/writer 8 is provided which reads corresponding to and a ticket code TC from the IC card 9, which is carried by the user. The personal computer of the admission control system 21 determines whether the read concert information and ticket code TC are valid. As a result of the determination, only a user retaining a ticket is allowed to enter the concert place.

1-2. Ticket Purchase Process

Figure 4:
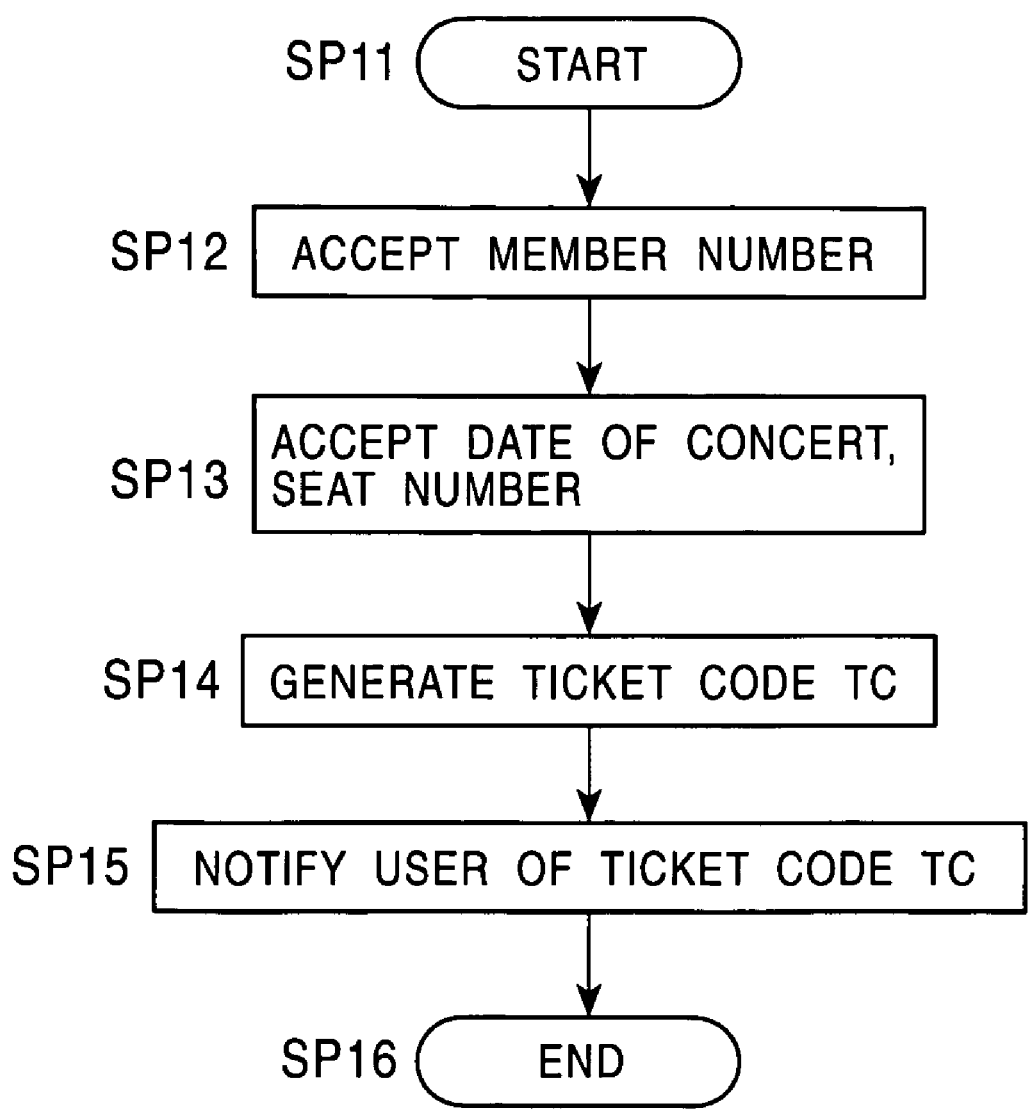
FIG. 4 is a flowchart showing a process performed by the ticket management center 2 (in the ticket distribution system 1 shown in FIG. 1) when a ticket is sold.
Figure 5:
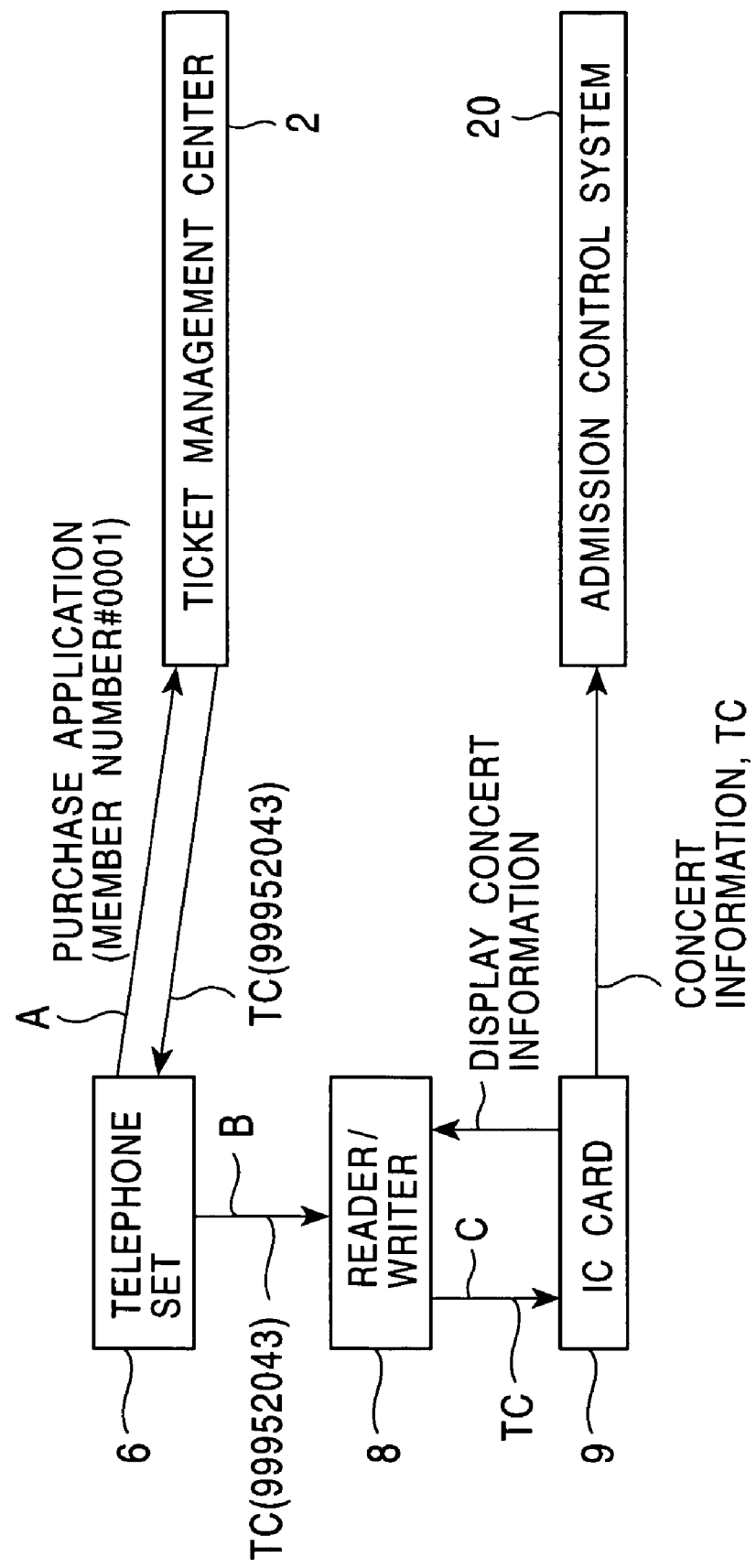
FIG. 5 is a block diagram showing the transmission of information when a ticket is sold.

FIG. 4 shows a process for the sale of tickets which is executed by the controller 3 in the ticket management center 2. In accordance with accessing from the user about purchase application, the controller 3 initiates the process in step SP11 and proceeds to step SP12. In step SP12, the controller 3 accepts the member number of the user, as denoted by arrow A shown in FIG. 5. In FIG. 5, for brevity of description, #0001 is used as the member number. The controller 3 confirms whether the member number is valid, based on a check code added to the member number. If the member number is invalid, the controller 3 terminates the process.

Conversely, if the member number is valid, the controller 3 proceeds to step SP13, and accepts the date of a concert, the name of an artiste, the place, the seat number, which are desired by the user. The controller 3 accesses the reservation server 4, and notifies the user of information on the concert date, the place, and available seat numbers. After that, the controller 3 obtains the information based on selection by the user.

When the controller 3 is finally informed that the user intends to buy about the confirmed concert, the controller 3 proceeds to step SP14, and creates concert information by using the seat number, etc. By using the concert information, and the seat number to drive the encoder/decoder 5 the concert information is encrypted to generate a ticket code TC. At this time, the controller 3 generates the ticket code TC by adding a predetermined check code to the concert information. In FIG. 5, a ticket code TC, which is 99952043, is generated.

The controller 3 proceeds to step SP15. In step SP15, the controller 3 notifies the user of the ticket code TC, and accesses the reservation server 4 to record a sale of the seat number corresponding to the ticket code TC. For an application for ticket purchase from the user, the controller 3 sells a ticket by issuing the ticket code TC. The controller 3 proceeds to step SP16, and the process ends.

In ticket purchase, the ticket code TC obtained as described above is input to the IC card 9 via the reader/writer 8, as denoted by the arrows B and C shown in FIG. 5.

In the above description, the ticket management center 2 serves as an information management apparatus that records transfer of a right to the user by updating event-related right information recorded in the reservation server 4 and that provides the user with information indicating to whom the transferred right belongs to, and the reservation server 4 serves as an information holding means. The controller 3 serves as an access means that records the transfer of the right to the user by accessing the reservation server 4, and the encoder/decoder 5 serves as an encryption means that generates encrypted information by using a code unique to the portable electronic device to encrypt the information indicating to whom the right belongs to be in an offline providable form. A means for communicating with the telephone 6, a mail printing means, etc., which are not shown, provide in combination an information providing means that provides the user with the encrypted information so that the encrypted information passes through an offline channel at least once.

Figure 6:
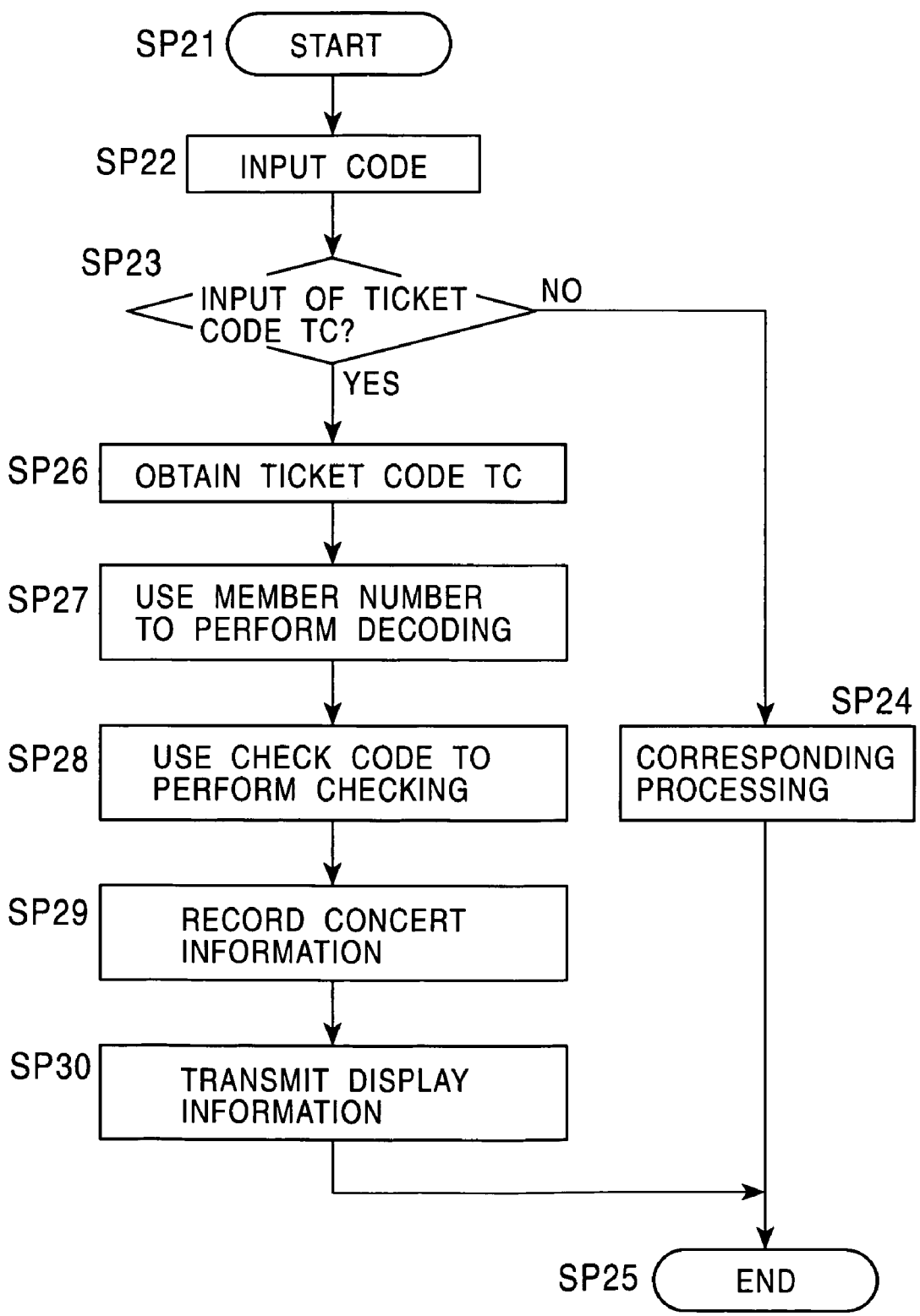
FIG. 6 is a flowchart showing a process performed by the controller 19 of the IC card 9 (in the ticket distribution system 1) when a ticket is sold.

FIG. 6 shows a process performed by the controller 19 in the IC card 9 when the ticket code TC is input. In the following description of the controller 19 in the IC card 9, the call made by the reader/writer 8, described using FIG. 3, and the process for the mutual authentication are omitted.

When being supplied with power from the reader/writer 8, the controller 19 of the reader/writer 8 initiates to operate in step SP21. The process proceeds to step SP22, and the code corresponding to the operation of the ten-key pad 8A is input to the controller 19. The controller 19 proceeds to step SP23, and determines whether the input code represents an instruction of inputting the ticket code TC. If the controller 19 has determined negatively, the controller 19 proceeds to step SP24 and executes processing in accordance with the input code, whereby processing for distribution and cancellation (described below) is executed. After that, the controller 19 proceeds to step SP25, and terminates the process. By executing processing corresponding to the input code in step S24, the controller 19 can display the information recorded in the flash memory 20 by the reader/writer 8. This enables the user to confirm, for example, the member number, the recorded ticket code TC, etc.

In step SP23, if the controller 19 has determined that the input code represents the input of the ticket code TC, the controller 19 proceeds to step S26, and obtains the ticket code TC from the reader/writer 8. The controller 19 instructs the reader/writer 8 to display a message. This informs the user that the user's operation of the ten-key pad 8A has selected the input of the ticket code TC. Subsequently, the controller 19 instructs the switching of the displayed message, and prompts the user to input the ticket code TC by using the ten-key pad 8A.

After obtaining the ticket code TC, as described above, the controller 19 terminates the process when the history recorded in the flash memory 20 indicates that the obtained ticket code TC was input in the past and was distributed to the third party. This enables the controller 19 to prevent double and triple copying by unlawful conduct of the user, reselling, etc.

In step SP28, the controller 19 controls the operation of the encoder/decoder 17, and uses the member number to decode the ticket code TC, whereby the transmitted, encrypted concert information is obtained.

In step SP29, based on the check code added to the ticket code TC when it was generated, the controller 19 confirms the decrypted concert information, thereby confirming the validity of the ticket code TC. When the result of the confirmation indicates that the ticket code TC was not issued by the ticket management center 2, the controller 19 terminates the process, and excludes the ticket code TC unlawfully issued by the third party.

Conversely, when the result of the confirmation indicates that the ticket code TC was lawfully issued by the ticket management center 2, the controller 19 records the decoded concert information in the flash memory 20, with the ticket code TC. After that, the controller 19 proceeds to step SP30.

After transmitting display information based on the concert information to the reader/writer 8, the controller 19 proceeds to step SP25 and terminates the process.

Accordingly, in the IC card 9, which is retained by the user, concert information and ticket code TC that are desired by the user are recorded. By only bringing the IC card 9 close to the reader/writer 8 in the admission distribution system 21, the user is allowed to get admission.

Figure 7:
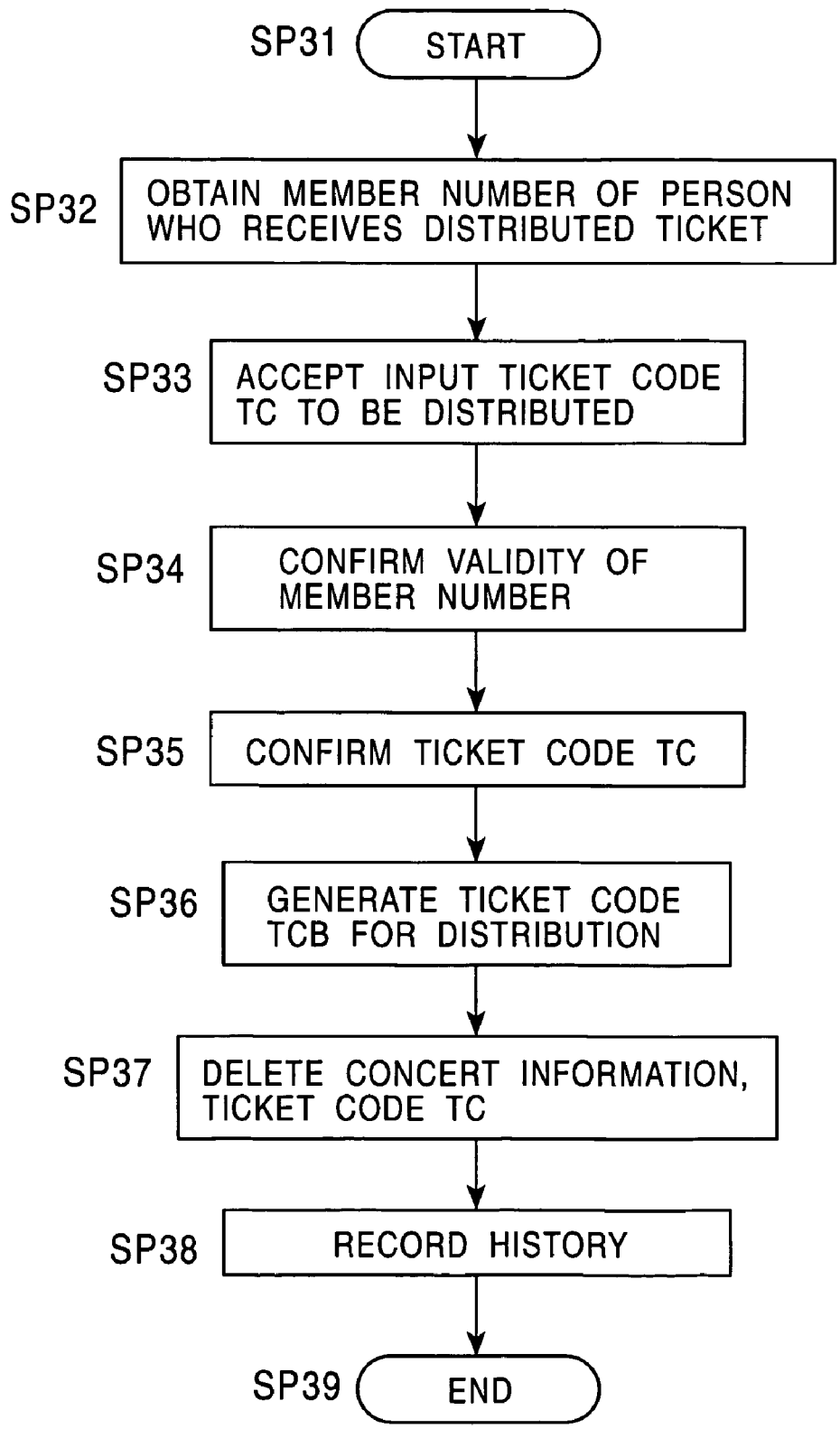
FIG. 7 is a flowchart showing a process performed by the controller 19 of the IC card 9 (in the ticket distribution system 1 shown FIG. 1) when a ticket is distributed.

In the above description, the reader/writer 8 and the IC card 9 provide in combination the portable electronic device. The reader/writer 8, the antenna 14 of the IC card 9, and the modem 16 provide in combination an input means that accepts the ticket code TC as the encrypted information which is input by operating the ten-key pad 8A. The encoder/decoder 17 serves as a decryption means that decrypts the encrypted information using the member number as the unique code and that outputs the information indicating to whom the right belongs. The flash memory 20 serves as a recording means that records the output information indicating to whom said right belongs, which is output by the decryption means. The modem 16 serves as an information output means that outputs, by using the reader/writer 8 as the access means, which is provided in the ticket distribution system 1, the recorded information indicating to whom said right belongs 1-3. Process for the Distribution of Tickets FIG. 7 shows a process executed by the controller 19 in the IC card 9 when tickets purchased at the same time by the user are distributed to friends, etc. When ticket distribution is selected by operating the ten-key pad 8A by the user, the controller 19 executes this process in the above-described step S24.

Figure 8:
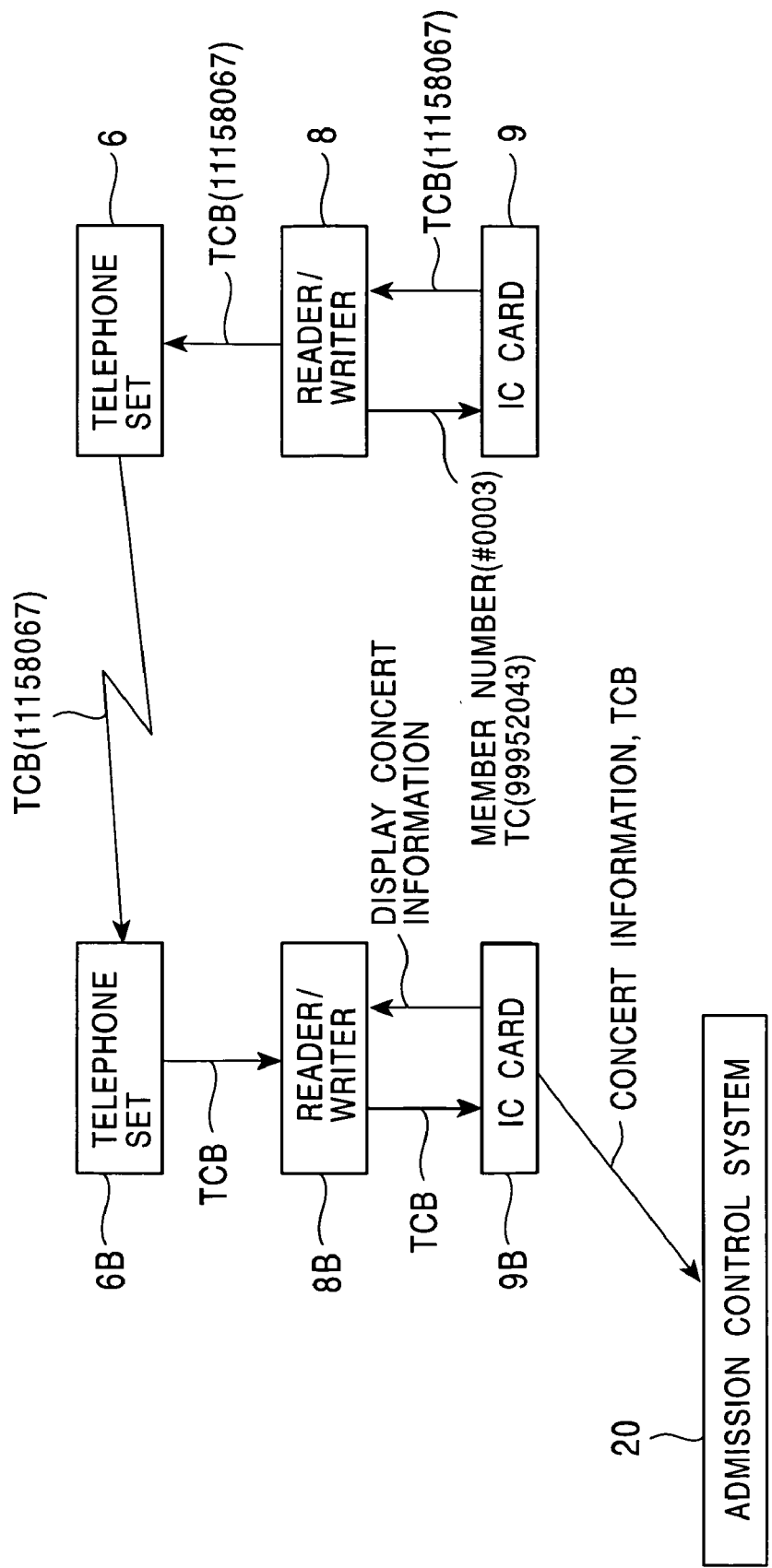
FIG. 8 is a block diagram showing information transmission in ticket distribution.

After initiating the process in step SP31, the controller 19 accepts the input of a person who receives a distributed ticket, as shown in FIG. 8. Also in this case, the controller 19 instructs the reader/writer 8 to display a message. This informs the user that the user's operation of the ten-key pad 8A has selected the distribution of ticket codes TCs. The controller 19 instructs the switching of the displayed message, and prompts the user to input a member number by operating the ten-key pad 8A. As shown in FIG. 8, the controller 19 obtains #0003 as a member number.

After obtaining the member number, the controller 19 proceeds to step SP33, and accepts the input of ticket codes TCs to be distributed. At this time, in response to the operation of the ten-key pad 8A by the user, the controller 19 displays recorded ticket codes TCs, which assists the user to input the ticket codes TCs.

Subsequently, the controller 19 proceeds to step SP34, and determines whether each of the input member numbers is valid based on the check code added to the member number. In step SP35, the controller 19 uses the check code to confirm the validity of the obtained ticket code TC. When the result of the confirmation indicates a doubt about the validity, the controller 19 terminates the process.

If the controller 19 has confirmed that the member number and the ticket code TC are valid, it proceeds to step SP36. In step SP36, after adding a check code to concert information based on the ticket code TC, the controller 19 drives the encoder/decoder 17, and encrypt the concert information, using the member number (#0003) of a person who receives the distributed ticket code TC. Thereby, the IC card 9 controls the ticket management center 2 to generate a ticket code TCB which is identical to that generated to the member who receives the distributed ticket. In FIG. 8, 11158067 is generated as a ticket code TCB. The controller 19 instructs the reader/writer 8 to display the generated ticket code TCB.

The controller 19 proceeds to step S37, and deletes the concert information based on the ticket code TCB and the original ticket code TC from the flash memory 20. After recording the deletion of the ticket code TC and the ticket code TCB in the history in step SP38, the controller 19 proceeds to step SP39 and terminates the process. As described above, based the recorded history, the controller 19 prevents double and triple transfer of the ticket, etc. The controller 19 can display the history, as required, in accordance with the operation of the ten-key pad 8A. If a member who receives the distributed ticket has forgot to input the once displayed ticket code TCB to the IC card 9, the member is notified again for enabling input.

As shown in FIG. 8, via offline channels such as mail, telephone, and electronic mail, each user who receives a distributed ticket uses a reader/writer 8B to input a ticket code TCB to an IC card 9B. This enables the user to get admission to a concert place.

In the above description, the encoder/decoder 17 serves as an encryption means that generates, by using a code unique to the IC card 9B as another portable electronic device, the ticket code TCB as a second encrypted information based on the information indicating to whom the right belongs to, which is recorded in the recording means, so that the ticket code TCB can be provided offline. The controller 19 serves as a control means that controls, by erasing the concert information, etc., recorded in the flash memory 20, the information indicating to whom the right belongs not to be accessed depending on the type of reader/writer in the admission control system 21.

1-4. Ticket Cancellation

Figure 9:
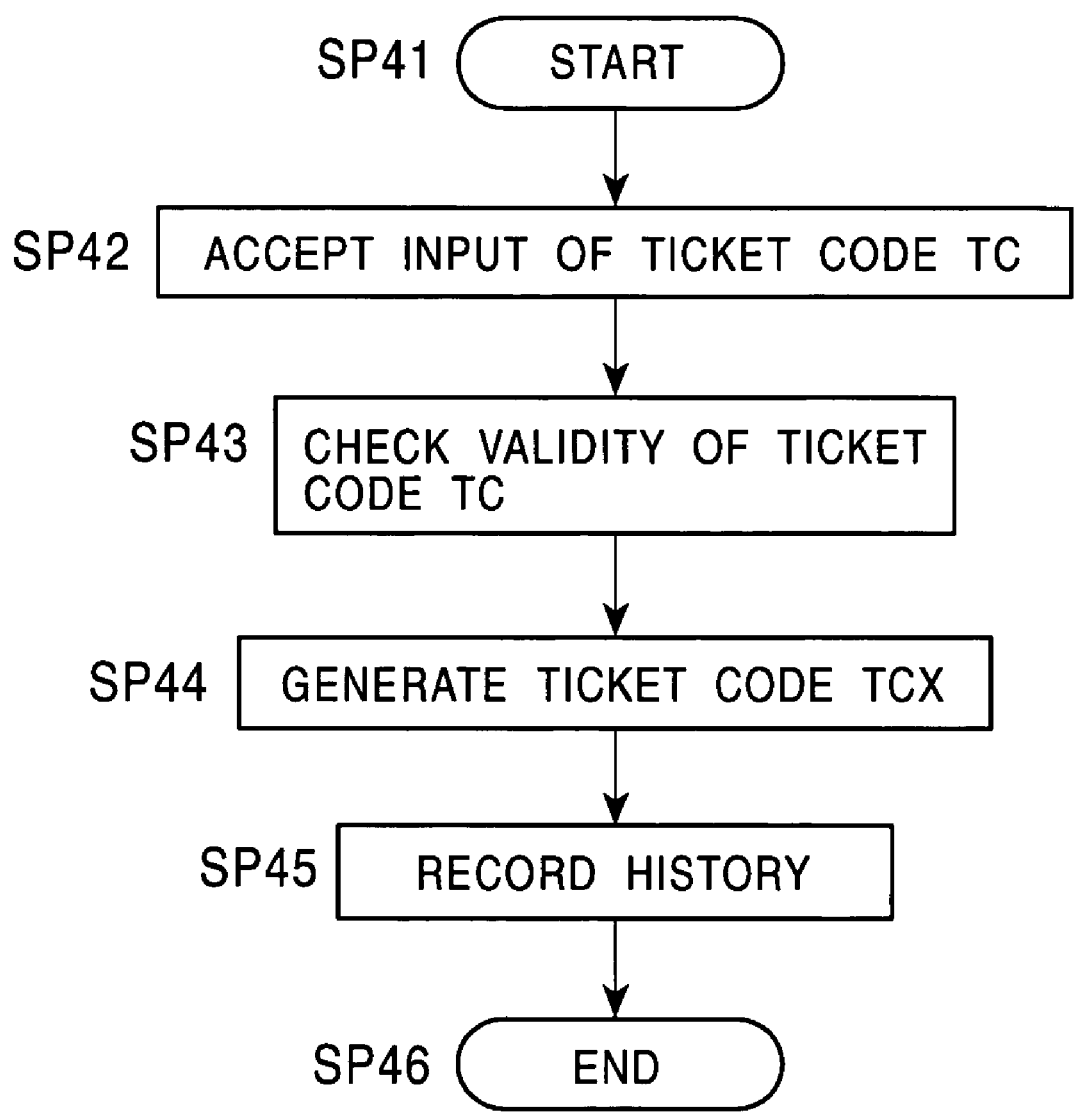
FIG. 9 is a flowchart showing a process performed by the controller 19 of the IC card 9 (in the ticket distribution system 1 shown in FIG. 1) when a ticket is canceled.

FIG. 9 shows a process executed by the controller 19 of the IC card 9 when a ticket is cancelled. When ticket cancellation is selected by operating the ten-key pad 8A by the user, the controller 19 executes this process in the above-described step S24 shown in FIG. 6. In the case shown in FIG. 10, the user inputs, for example, #9999 by operating the ten-key pad 8A.

Figure 10:
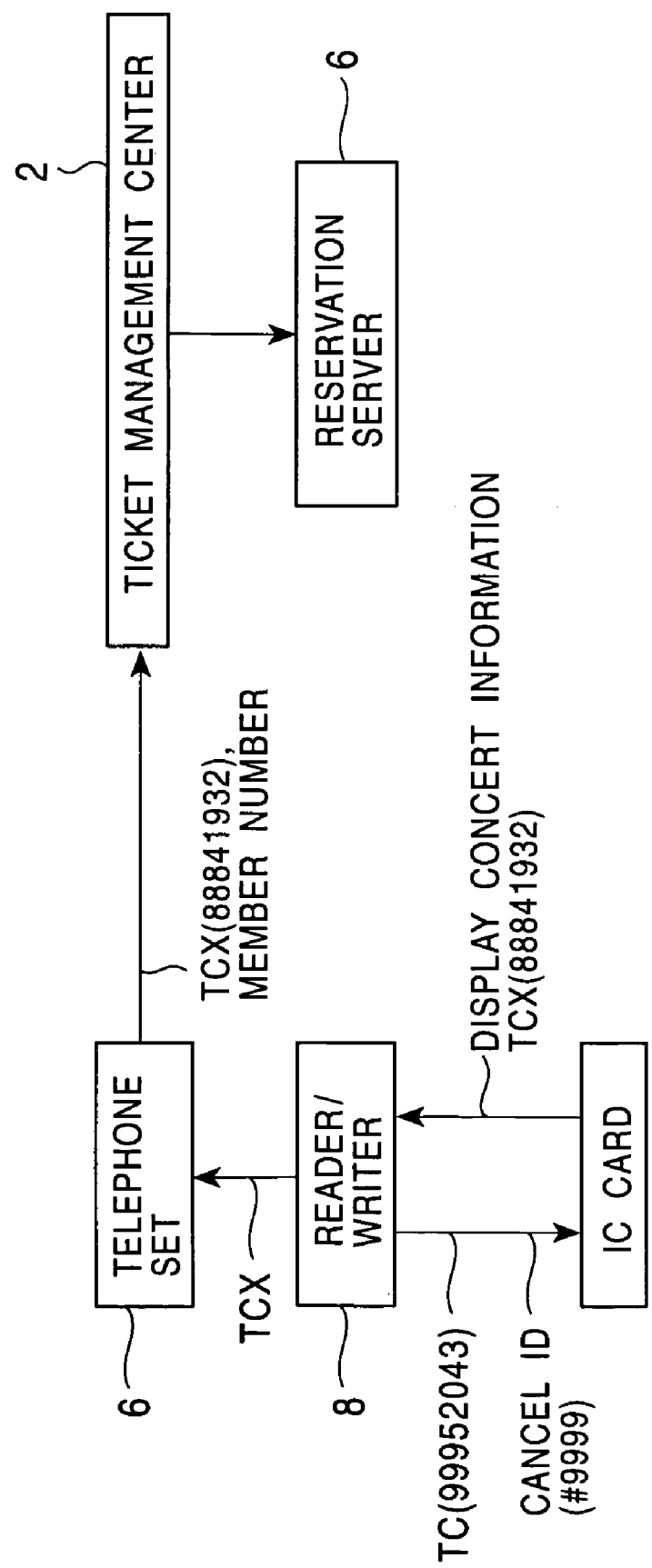
FIG. 10 is a block diagram showing information transmission in ticket cancellation.

After initiating the process in step S41, the controller 19 proceeds to step S42, and accepts the input of a ticket code TC to be cancelled, as shown in FIG. 19. Similarly, in this case, the controller 19 instructs the reader/writer 8 to display a message. This informs the user that the user's operation of the ten-key pad 8A has selected ticket cancellation. Subsequently, the controller 19 instructs the switching of the displayed message, and prompts the user to input the ticket code TC by operating the ten-key pad 8A. As shown in FIG. 10, the controller 19 obtains 99952043 as a ticket code TC.

In step SP43, based on the check code added to the ticket code TC, the controller 19 confirms whether the ticket code TC is valid. When the result of the confirmation indicates a doubt about the validity, the controller 19 terminates the process.

Conversely, if the controller 19 has confirmed that the ticket code TC is valid, it proceeds to step SP43. In step SP43, the controller 19 adds a check code to concert information based on the ticket code TC, and compresses the data size of the concert information. Subsequently, the controller 19 drives the encoder/decoder 17 to generate a ticket code TCX. At this time, the controller 17 instructs the reader/writer 8 to display the concert information of the ticket to be cancelled. When cancellation is instructed by the user, the controller 19 prevents the user from mistakenly canceling the ticket by terminating the process. In FIG. 10, 88841932 is generated as a ticket code TCX. The controller 19 instructs the reader/writer 8 to display the ticket code TCX.

Processing to step SP45, the controller 19 deletes the concert information and the original ticket code TC that relate to the ticket code TCX from the flash memory 20. The controller 19 proceeds to step SP46, and terminates the process.

Accordingly, the user can notify the ticket management center 2 of the cancellation-related ticket code TCX displayed by the reader/writer 8 by telephone, mail, or electronic mail, with the member number.

Figure 11:
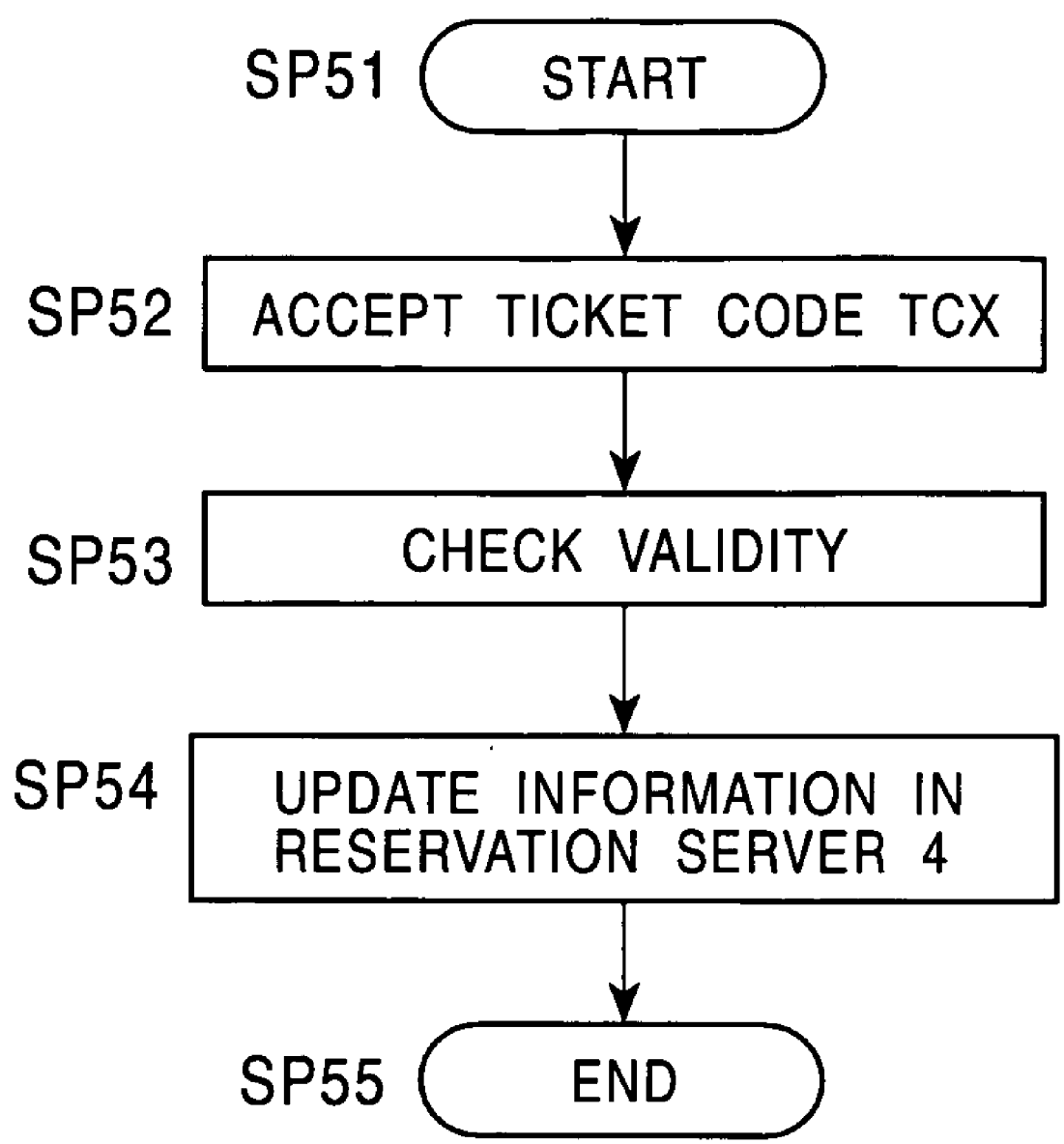
FIG. 11 is a flowchart showing a process performed by the controller 2 of the ticket management center 2 (in the ticket distribution system 1) when a ticket is canceled.

FIG. 11 shows a process for ticket cancellation which is performed by the controller 3 in the ticket management center 2. In response to a cancellation application from the user, the controller 3 initiates the process in step SP51 and proceeds to step SP52. In step SP52, the controller 3 accepts the input of the member number and the ticket code TCX from the user.

In step SP53, the controller 3 confirms based on the check code that the member number and the ticket code TCX are valid. When the result of the confirmation indicates that the member number and the ticket code TCX are invalid, the controller 3 terminates the process.

Conversely, when the member number and the ticket code TCX are valid, the controller 3 proceeds to step SP54. In step SP54, the controller 3 generates the concert information based on the ticket code TCX by using the encoder/decoder 5 to decrypt the ticket code TCX, which is encrypted. The controller 3 also accesses the reservation server 4, and updates information in the reservation server 4 so that a concert and a seat number which correspond to the concert information can be sold. The controller 3 accesses the account center 7, and executes refunding for the ticket cancellation in accordance with a contract with the user at the purchase. In this case, the account center 7 changes the charge of the purchase.

When the controller 3 changes settings for the sale by accessing the reservation server 4, as described above, the controller 3 changes them by confirming that the corresponding seat number has already been sold, and further by confirming, based on the record of the past, that the ticket corresponding to the ticket code TCB has not been cancelled. This prevents unlawful obtainment of refunding for double and triple cancellation of the ticket code TC.

After that, the controller 3 proceeds to step SP55, and terminates the process. Accordingly, if there is still a time until the start of the concert, the ticket management center 2 can sell the cancelled ticket to the third party again, and the third party can transfer the ticket to another. Also, the third party not only can simply buy the cancelled ticket but also can buy a better ticket than a previously purchased ticket.

In the above description, the controller 19 in the IC card 9 serves as an information generating means that generates, based on the information indicating to whom the right belongs to, which is stored in the flash memory 20 as the recording means, information for requesting the transfer of the right to the ticket management center 2. The encoder/decoder 17 serves as an encryption means that generates the ticket code TCX as encrypted transfer information by using a unique code to encrypt the information for requesting the transfer so that the ticket code TCX can be provided offline. The controller 3 serves as a control means that controls the original concert information and the ticket code TC not to be accessed depending on the type of reader/writer in the admission control system 21. The modem 16, the antenna 14, and the reader/writer 8 provide in combination an output means that outputs the encrypted transfer information so that it passes through an offline channel at least once.

Also, in the ticket management center 2, the encoder/decoder 5 serves as a decryption means that decrypts the encrypted ticket code TCX as the encrypted transfer information.

1-5. Operation of First Embodiment

In the above-described construction, when a user desires to buy a ticket, and establishes a link to the ticket management center 2 by operating the telephone set 6, control by the controller 3 provides a speech-used guide to the user. The guide informs the user of, for example, providable concerts and available seats. In accordance with the operation of the ten-key pad of the telephone set 6, a ticket code TC is issued from the ticket management center 2.

When the user uses the telephone set 6 to respond with speech, or applies for purchase by mail, input by an operator in the ticket management center 2 issues a ticket code TC. The user is notified of the ticket code TC by speech via the telephone set 6. For the application by mail, the user is notified of the ticket code TC by mail, and for the application by electronic mail, the user is notified of the ticket code TC. This allows the ticket code TC to be provided to the user so that it passes through an offline channel at least once. For the issuance of the ticket code TC, charging in the account center 7 is instructed.

At this time, the ticket management center 2 creates concert information, based on information such as the concert date, the place, and the seat number, and creates a ticket code TC by performing encryption using a member number unique to the user. When the ticket code TC is transmitted to the user by means such as speech, mail, and electronic mail, even if the third party unlawfully obtains the ticket code TC, the ticket distribution system 1 can prohibit a third party from using the ticket code TC, whereby security can be maintained.

In the generation of the ticket code TC, the ticket management center 2 generates the ticket code TC after confirming the validity of the member number using the check code added to the member number, whereby the ticket management center 2 can prevent unlawful purchase by a third party pretending to be the user corresponding to the member number.

The generation of the ticket code TC by adding the check code to the concert information prevents the ticket code TC which is unlawfully generated by a third party from being distributed. Also, by generating the ticket code TC after adding the check code to the concert information and performing data compression, the length of the ticket code TC can be shortened when the ticket code TC is transmitted by speech. This can prevent the user from mistakenly inputting the ticket code TC.

By using the reader/writer 8, the ticket code TC is generated so as to correspond to the numerals of the ten-key pad 8A and so as to be input by operating the ten-key pad 8A. This make it possible to provide the ticket code TC offline and to input the ticket code TC to the IC card 9 by operating the reader/writer 8.

According to the ticket distribution system 1, if a user has no online apparatus such as a personal computer, the ticket code TC, which is encrypted information, can be provided to user by means such as mail, telephone, or telegram. This can simplify the distribution of information to the user. In other words, if the user has no online apparatus such as a personal computer, the user can obtain the ticket code TC by applying for purchase via the desired communication channel, and the ticket management center 2 can complete the sale of a ticket by notifying the user of the ticket code TC via the corresponding communication channel. Therefore, compared with a case in which a paper ticket is sold, the distribution of the ticket to the user can be greatly simplified, and a convenience can be given to the user.

Since the ticket code TC, provided to the user, can be electronically recorded, management can be simplified when the right is transferred to a third party when simultaneously purchased rights are distributed, and when purchase is cancelled.

Specifically, the user overlays the reader/writer 8 on the IC card 9, and operates the ten-key pad 8A of the reader/writer 8 to set, as the operation mode of the IC card 9, a mode for inputting the ticket code TC. Subsequently, the user operates the ten-key pad 8A of the reader/writer 8 to input the ticket code TC so that it is recorded in the flash memory 20 of the IC card 9.

At this time, the operation of the ten-key pad 8A of the reader/writer 8 is transmitted to the IC card 9, based on the link between the antenna 13 of the reader/writer 8 and the antenna 14 of the IC card 9. The reader/writer 8 is notified of information to be displayed on the liquid crystal display, and the IC card 9 is notified of the ticket code TC.

The ticket code TC is decrypted and decompressed by the encoder/decoder 17, whereby the original concert information is reproduced. The reproduced concert information and the ticket code TC are recorded in the flash memory 20.

At this time, using the check code added to the ticket code TC, the validity of the ticket code TC is confirmed. This prevents unlawful admission to the concert which is caused by the ticket code TC unlawfully generated by the third party.

According to the ticket distribution system 1, when the user visits the concert place while carrying the IC card 9 containing the concert information and the ticket code TC, a reader/writer in the admission control system 21 reads the concert information and the ticket code TC from the IC card 9. When the concert information and the ticket code TC are valid, the user is allowed to enter the concert place. This enables a user who bought the ticket to enter the desired concert place and to enjoy the concert on the seat of the seat number based on the concert information.

According to the ticket distribution system 1, when one user buys a plurality of tickets, the ticket management center 2 issues ticket codes TCs corresponding to the number of tickets. The issued ticket codes TCs can be decrypted only by the IC card 9 for the user. The user retains the ticket codes TCs, which are recorded in the IC card 9. This can greatly prevent a loss of tickets, compared with the case of tickets made of paper.

Accordingly, accompanying the user of the IC card 9, who input the ticket codes TCs corresponding to the tickets, persons who asked the user to buy the tickets can enter the concert place.

However, in a case in which some of the persons are unable to accompany the user, the user needs to give their tickets to them, that is, the user needs to distribute their tickets to them. In this case, according to the ticket distribution system 1 (shown in FIG. 8), when the user operates the reader/writer 8 to input, to the IC card 9, each member number as a distribution destination and each ticket code TC to be distributed, a ticket code TCB is generated. Each person (as the distribution destination) is notified of the ticket code TCB, and the person executes operations identical to those executed when the tickets were purchased by the ticket management center 2, whereby the ticket code TCB and the concert information are recorded in an IC card retained by the person as the distribution destination. This enables ticket distribution.

The ticket distribution system 1 enables simplified distribution of tickets by, based on a member number unique to a person as a distribution destination, encrypting each ticket code TC so that it can be provided offline similarly to the issuance of the ticket code TC from the ticket management center 2 and so that it can be input with keys of a portable electronic device for the distribution destination, and displaying the ticket code TC from the reader/writer 8, or by generating a ticket code TC so that it can be transmitted in accordance with an action of a person having read the display. In other words, the user who read the displayed ticket code TC notifies persons (distribution destinations) of ticket codes TCs by communication means such as telephone, telegram, or electronic mail. Accordingly, each person can obtain the ticket code TCB via the communication means, even if the person has no online equipment. This can simplify management of the tickets after the tickets were distributed to the persons.

In other words, after accepting the input of the member number of a distribution destination and a ticket code TC to be distributed, and confirming whether the member number and the ticket code TC are valid, the distributor side adds a check code to concert information corresponding to the ticket code TC, compresses the concert information, and uses the member number to encrypt the concert information, whereby a ticket code TCB is generated which is identical to that obtained by the purchase of the ticket. The ticket code TCB is displayed by the reader/writer 8. The user who read the display informs the distribution destination of the ticket code TCB. Similarly to the case that the ticket is purchased from the ticket management center 2, the distribution destination is notified of the ticket code TCB.

In the distribution destination, as shown in FIG. 8, by operating the reader/writer 8B, the ticket code TCB and the concert information based on the ticket code TCB are recorded in the flash memory of the IC card 9B.

At this time, the IC card 9 confirms whether the member number and the ticket code TC are valid, and generates the ticket code TCB. This can prevent the generation of a unlawful ticket code TCB using the IC card 9. Also, this can prevent a third party who pretends to be a member from unlawfully obtaining the ticket code TCB.

In addition, the distribution destination side uses the check code to confirm the validity of the ticket code TCB. This can prevent the distribution of a ticket code TCB which is unlawfully generated.

Accordingly, the ticket distribution system 1 can improve system reliability.

When the distributor side generates the ticket code TCB, it deletes the original concert information and the ticket code TC. This prevents unlawful admission to the concert place using the original ticket code TC.

When a ticket is sold by notifying each user of ticket code TC, there is a possibility that the user loses a record of the ticket code TC before it is recorded in the IC card 9. Nevertheless, in this case that the ticket is sold using the ticket code TC, the ticket management center 2 can record a member number to which the ticket is sold, a sold ticket code, concert information, etc. Therefore, if the user loses a ticket code TC, the user can be helped by notifying the user of the ticket code TC again.

This also causes a possibility that, since a user unlawfully obtains a reissued ticket code TC by pretending that the user lost a ticket code, the user obtains a profit using a ticket based on the reissued ticket code TC. However, a record of issuance is recorded in the IC card 9, and the record makes it difficult to input the ticket code TC again. This can prevent unlawful conduct by the third party, even in the case of helping the user who lost the ticket code TC.

In addition, a case is considered in which a user is unable to go to the concert. In this case, in the ticket distribution system 1 (shown in FIG. 10), by operating the reader/writer 8 by the user who bought a ticket, the IC card 9 generates a ticket code TCX for canceling the ticket, similarly to the case that the ticket management center 2 issues a ticket code TC, of which the ticket management center 2 is notified.

Specifically, the IC card 9 accepts the input of an ID for canceling the ticket and the ticket code TC to be cancelled, and confirms whether they are valid. After a check code is added to concert information corresponding to the ticket code TC, and the information is compressed, the compressed information is encrypted using the ticket canceling ID to generate the ticket code TCX. Accordingly, the ticket canceling ID corresponds to a member number of the ticket management center 2, which is similar to the member number of each user.

The ticket code TCX is displayed by the reader/writer 8, and the ticket management center 2 is notified of the displayed ticket code TCX by user's action via an offline channel. The user who will cancel the ticket can cancel the ticket by reading the ticket code TCX displayed on the reader/writer 8, and notifying the ticket management center 2 of the read ticket code TCX by a communication means such as telephone, telegram, or electronic mail. This can also simplify the management of the ticket delivered to the user.

At this time, by confirming the validity of the ticket code TC to be canceled, and further generating the ticket code TCX by steps including the addition of a check code to concert information, ticket cancellation using an unlawfully generated check code can be prevented.

Accordingly, the ticket management center 2, which receives the ticket code TCX, accepts ticket cancellation by confirming the validity of the ticket code TCX, and subsequently accessing the reservation server 4 to change settings for a corresponding sold seat number to those for a seat number that has not been sold yet. In accordance with the cancellation, the ticket management center 2 accesses the account center 7 to execute refunding to the user.

After accepting the cancellation, as described above, the ticket management center 2 can sell the canceled ticket, and can compensate for the loss due to the refunding for the ticket. Also, a user can obtain a sold-out ticket by awaiting the cancellation of the ticket, and can further upgrade a seat corresponding to the purchased ticket. This enables an improvement in user's convenience.

In the conventional ticket distribution system, when a user deals with an unnecessary ticket, the user need to go and ask a so-called "ticket exchanger" to buy the ticket. When a user intends to obtain a sold-out ticket or to upgrade a seat corresponding to a purchased ticket, the user need to go and query ticket exchangers located in different places about the ticket. Otherwise, the user needs to make use of a market homepage on the Internet. Compared with the conventional ticket distribution system, the present invention can greatly improve user's convenience.

Since the ticket management center 2 accepts, based on the record in a reservation server 6, the cancellation of a ticket when it is canceled, double and triple cancellation using the ticket code TCB can be prevented, so that unlawful obtainment of a refund can be prevented.

In this case, after canceling the ticket, the user can buy a new ticket. This also improves user's convenience.

1-6. Effects of First Embodiment

According to the above-described construction, by using a code unique to a portable electronic device to encrypt concert information as information indicating to whom a right belongs so that the concert information can be provided offline, and providing a ticket code TC generated by the encryption so that it passes through an offline channel at least once, the distribution to each user of concert ticket information as information indicating to whom a right belongs can be simplified, and the management of the concert ticket information delivered to each user can be simplified.

2. Other Embodiments

In the first embodiment, a case has been described in which ticket codes are distributed by communications among users. However, the present invention is not limited to the case, but the ticket codes may be distributed via the ticket management center 2.

In the first embodiment, a case has been described in which, when a ticket is canceled, and when a ticket is distributed, by erasing corresponding concert information from the flash memory 20, the concert information cannot be accessed depending on the type of reader/writer in the admission control system 21. However, the present invention is not limited to the case, but the accessing of the concert information may be controlled based on a record.

In the first embodiment, a case has been described in which ticket codes TCs are only issued corresponding to the number of tickets purchased from the ticket management center 2. However, the present invention is not limited to the case, but, by creating a number of ticket codes TCs so as to include the number of the purchased tickets, one ticket code TC may be issued for each application for purchase, irrespective of the number of the purchased tickets. In this case of issuing one ticket code TC for a purchase application, one ticket code TC may be issued for a plurality of applications for concert tickets.

In the first embodiment, a case has been described in which the encoder/decoder 17 encrypts or decrypts concert information. However, the present invention is not limited to the case, but processing such as encryption may be executed by controller processing.

In the first embodiment, a case has been described in which a ticket code is transmitted and received by telephone, mail, or electronic mail. However, the present invention is not limited to the case, but an online channel may be used for the transmission or reception.

In the first embodiment, a case has been described in which the reader/writer 8 as an input unit and the IC card 9 are separately used. However, the present invention is not limited to the case, but the input unit may be integrated with the IC card 9.

In the first embodiment, a construction has been described in which the IC card 9, which is of a noncontact type, is used as a portable electronic device. However, the present invention is not limited to the construction, but various types of digital information storing units, such as a personal computer, a cellular phone, a digital camera, and a digital video camera, may be applied to the portable electronic device.

Figure 12:
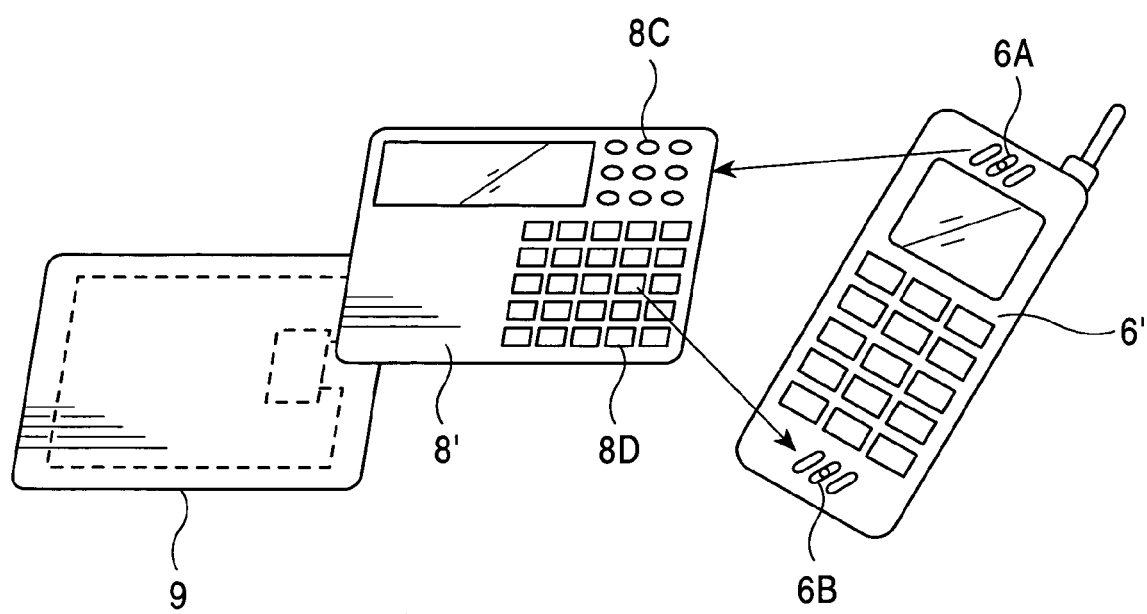
FIG. 12 is a plan view showing a construction of a user side in another embodiment of the present invention.

In the first embodiment, notification of a ticket code TC with speech in telephone communication, and notification of a ticket code TC by displayed characters in mail or electronic mail has been described. However, the present invention is not limited to the notification methods, but, as shown in FIG. 12, by providing a reader/writer 8D with a microphone 8C and a speaker 8D, notification of a ticket code TC may be performed by the transmission/reception of a dial tone to/from a cellular phone 6' having a speaker 6A and a microphone 6B.

In the first embodiment, a case has been described in which the IC card 9 confirms the validity of a ticket code TC and encodes or decodes concert information. However, the present invention is not limited to the case, but the reader-writer 8 may confirm the validity of the ticket code TC and may encode or decode the concert information.

In the first embodiment, a case of recording decoded concert information in the flash memory 20 has been described. However, the present invention is not limited to the case, but, after recording only the ticket code TC in the flash memory 20, the ticket code TC may be decoded, as required.

In the first embodiment, a case has been described in which concert information is generated using a concert data, etc., and a seat number. However, the present invention is not limited to the case, but, for a concert in which seats are simply graded, the concert information may be generated using the concert date, etc., and a seat grade.

In the first embodiment, management of tickets as rights of admission to the concert place has been described. However, the present invention is not limited to the management, but may be widely applied to cases in which prepaid cards, public transport coupons, season tickets, and securities are managed.

In the first embodiment, a case has been described in which a ticket code TC is generated based on a serial number. However, the present invention is not limited to the case, but the ticket code TC may be generated based on serial numbers and alphabets if the portable electronic device has a keyboard.

What is claimed is:

1. An access-information distribution method comprising the steps of:

generating access-information and verification information for authenticating the validity of a first portable electronic device when the access-information is stored in said first portable electronic device, the access-information including information which permits admission to a predetermined place;

generating an access-code by encrypting the access-information and the verification information, wherein said access-code is provided to a user offline;

communicating the access-code to said first portable electronic device by wirelessly coupling a second portable electronic device to said first portable electronic device, wherein said second portable electronic device is operable independent of a connection status of said second portable electronic device, the generated access code being represented in at least one of an audible and visible form to input the access code into said first portable electronic device by the user;

decrypting the access-code communicated to said first portable electronic device and using the verification information to authenticate the access-information based on the decrypted access code; and storing the authenticated access-information in said first portable electronic device, wherein the first portable electronic device is associated with the user, and the access-information stored on said first portable electronic device is transferable by a the user to other portable electronic devices associated with other users.

2. An access-information distribution method according to claim 1, wherein said first portable electronic device is an integrated circuit card and said second portable electronic device includes an input means.

3. An access-information distribution method according to claim 2, wherein the storing of the access-information is performed when said first portable electronic device and said second portable electronic device are electromagnetically coupled with each other.

4. An access-information distribution method according to claim 1, further comprising the steps of:
inputting a first access code added to the access-information, and an identification number for returning the access-information to a source of the access-information; and
after confirming the input first access code and the input identification number, confirming an offline-providable second access code for returning the access-information to said source of the access-information, and invalidating said first access code.

5. An access-information distribution method according to claim 1, wherein the access-information stored on said first portable electronic device is transferable by the user to a second portable electronic device associated with a second user by generating a second access code by encrypting the access-information and second verification information, wherein the second access code is provided to the second user offline.

6. An access-information distribution method according to claim 1, wherein inputting the access code into said first portable electronic device by the user includes:
the user sensing the access code represented in at least one of the audible and visible form;
the user manually inputting the access code into an input device of the second portable electronic device; and
transmitting the access code to the first portable electronic device from the second portable electronic device.

7. An access-information distribution method for transferring access-information from a first portable electronic device to a second portable electronic device, the access-information distribution method comprising the steps of:
generating the access-information and verification information for authenticating the validity of said first portable electronic device when the access-information is stored in said first portable electronic device, the access-information including information which permits admission to a predetermined place;
generating a first access code by encrypting the access-information and the verification information, wherein said first access code is provided to a user offline;
enabling the user to wirelessly input the first access code and identification number of said second portable electronic device directly into said first portable electronic device independently of a connection status of said second portable electronic device, the generated first access code being represented to the user in at least one of an audible and visible form;
confirming the wireless input of the first access code and the wireless input of the identification number;
invalidating the first access code and generating a second access code, wherein said second access code is provided to the user offline;
enabling the user to input the second access code into said second portable electronic device independently of the connection status of said second portable electronic device, the generated second access code being represented to the user in at least one of an audible and visible form;
decoding the offline-provided second access code inputted into the portable electronic device and authenticating the decoded second access code; and
storing the access-information included in the authenticated second access code in said second portable electronic device,
wherein the first portable electronic device is associated with the user, and the access-information stored on said first portable electronic device is transferable by a the user to other portable electronic devices associated with other users.

8. An information distribution system comprising:
a portable electronic device; and
an information management apparatus configured to store (i) access-information that indicates a predetermined access and (ii) device information corresponding to said portable electronic device that indicates to whom the predetermined access belongs, wherein said information distribution system manages the location of said predetermined access by updating the access-information stored by said information management apparatus and the device information indicating to whom said predetermined access belongs; said information management apparatus comprising:
information holding means for holding the access-information;
access means for recording the transfer of said predetermined access to said portable electronic device by accessing said information holding means and updating the access-information held by said information holding means;
encryption means for generating encrypted information by using a code unique to said portable electronic device to encrypt the device information indicating to whom said access belongs to be in an offline providable form; and
information providing means for providing said portable electronic device with the encrypted information so that the encrypted information passes through an offline channel at least once; and said portable electronic device comprises:
power supply;
input means for wirelessly accepting the input of the encrypted information into said portable electronic device independently of a connection status of said portable electronic device, the generated encrypted information represented to a user in at least one of an audible and visible form;
decryption means for decrypting the encrypted information using said unique code and outputting the information indicating to whom said access belongs;
recording means for recording the output information indicating to whom said access belongs; and
information output means for using a predetermined access means to output the recorded information indicating to whom said access belongs,
wherein the first portable electronic device is associated with the user, and the access-information stored on said first portable electronic device is transferable by a the user to other portable electronic devices associated with other users.

9. An information distribution system according to claim 8, wherein said device information indicating to whom said access belongs is information for permitting admission to a predetermined place.

10. An information distribution system according to claim 8, wherein said information management apparatus executes billing in response to the provision of the encrypted information by said information providing means.

11. An information distribution system according to claim 8, wherein said portable electronic device comprises:
information generating means for generating information for requesting the transfer of said access based on the information recorded in said recording means;
means for generating encrypted transfer information by using a code unique to encrypt the information for requesting the transfer of said access so that the encrypted transfer information is provided offline;
control means for controlling the accessing of the information recorded in said recording means in response to the encryption by said encryption means;
output means for outputting the encrypted transfer information so that the encrypted transfer information passes through an offline channel at least once; and
said information management apparatus further comprises a decryption means for decrypting the encrypted transfer information, and updates access-information which corresponds to the output of said decryption means by using said access means to access said information holding means in response to the output of said decryption means.

12. An information distribution system according to claim 11, wherein said information management apparatus executes billing in response to the provision of the encrypted information by the information providing means, and changes the billing in response to the encrypted transfer information.

13. An information distribution system according to claim 11, wherein said portable electronic device comprises:
encryption means for generating second encrypted information based on the information recorded in said recording means by using a code unique to a second portable electronic device so that the second encrypted information is provided off line;
control means for controlling the accessing of the information recorded in said recording means in response to the encryption by said encryption means; and
output means for outputting the second encrypted information so that the second encrypted information is provided to the second portable electronic device after passing through an offline channel at least once; and the second portable electronic device performs the processing of the second encrypted information, which is identical to the processing of the encrypted information by said portable electronic device.

14. An information management method for updating access-information held by an information management apparatus and for recording in a portable electronic device information indicating to whom said access belongs, managing said access so as to be exercised when said portable electronic device is with a user, wherein said information management method controls said information management apparatus to perform the steps of:
generating encrypted information in an offline providable form using a code unique to said portable electronic device to encrypt the portable electronic device information indicating to whom said access belongs;
providing the encrypted information so that the encrypted information passes through an offline channel at least once; and
enabling the wireless input of said encrypted information into said portable electronic device independently of a connection status of said portable electronic device, the generated encrypted information represented in at least one of an audible and visible form,
wherein the first portable electronic device is associated with the user, and the access-information stored on said first portable electronic device is transferable by a the user to other portable electronic devices associated with other users.

15. An information management method according to claim 14, wherein the billing is performed in response to the provision of the encrypted information.

16. An information management method according to claim 14, wherein said information management method controls said portable electronic device to perform the steps of:
generating encrypted transfer information by using a unique code to encrypt information for requesting the transfer of said access so that the encrypted transfer information is provided offline; and
preventing the information indicating to whom said access belongs from being output, and transmitting the encrypted transfer information to said information management apparatus so that the encrypted transfer information passes through the offline channel at least once.

17. An information management method according to claim 16, wherein said information management method controls said image management apparatus to perform the steps of:
executing a billing process in response to the provision of the encrypted information; and
changing said billing process in response to the encrypted transfer information.

18. An information management method according, to claim 14, wherein said information management method controls said portable electronic device to perform the steps of:
generating second encrypted information based on the information indicating to whom said access belongs by using a code unique to another portable electronic device so that the second encrypted information is provided offline; and
providing the second encrypted information to the other portable electronic device so that the second encrypted information passes through the offline channel at least once; and
outputting the second encrypted information and preventing the information indicating to whom said access belongs from being output.

19. An information management method according to claim 18, wherein said portable electronic device includes a read-write device in electromagnetic communication with an integrated circuit card, wherein the input means are included on the read-write device.

20. An information management method according to claim 18, wherein the information indicating to whom said access belongs is information for allowing said user to enter an event place.

21. A method of distributing information, the method comprising:
providing a first portable device;
generating access-information representative of a user access, the access-information including information which permits admission to a predetermined place;
generating verification information for authenticating the validity of the access-information and the first portable electronic device;
storing the access-information and the verification information on the first portable device;

encrypting the access-information and the verification information to generate a access code;

providing a second portable device, the second portable device configured to wirelessly communicate with the first portable device;

inputting the access code into the second portable device and wirelessly communicating the access code to the first portable electronic;

decrypting the access-information and the verification information based on the access code communicated to the first portable electronic device, and utilizing the verification information to authenticate the access-information stored on the first portable electronic device; and storing the authenticated access-information on the first portable electronic device, wherein the first portable electronic device is associated with the user, and the access-information stored on said first portable electronic device is transferable by a the user to other portable electronic devices associated with other users.

22. The method of claim 21 further comprising providing an indication of the access code to a user.

23. The method of claim 22, wherein the indication is an audible indication or a visible indication.

24. The method of claim 21, wherein said first portable electronic device is an integrated circuit card and said second portable electronic device includes an input device.

25. The method of claim 21, wherein providing the second portable device includes electromagnetically coupling the second portable device to the first portable device.

26. The method of claim 25, wherein electromagnetically coupling the second portable device to the first portable device provides driving power to the second portable device.

* * * * *